US008972313B2

(12) United States Patent
Ahn et al.

(10) Patent No.: US 8,972,313 B2
(45) Date of Patent: Mar. 3, 2015

(54) APPARATUS AND METHOD FOR LEARNING EMOTION OF ROBOT

(71) Applicant: Korea Institute of Industrial Technology, Chungcheongnam-do (KR)

(72) Inventors: Ho Seok Ahn, Incheon (KR); Dong Wook Lee, Incheon (KR); Woong Hee Shon, Gyeonggido (KR)

(73) Assignee: Korea Institute of Industrial Technology, Cheonan-si (KR)

( * ) Notice: Subject to any disclaimer, the term of this patent is extended or adjusted under 35 U.S.C. 154(b) by 262 days.

(21) Appl. No.: 13/632,532

(22) Filed: Oct. 1, 2012

(65) Prior Publication Data

US 2014/0093849 A1    Apr. 3, 2014

(51) Int. Cl.
    G06F 15/18    (2006.01)
    G06N 3/00     (2006.01)
(52) U.S. Cl.
    CPC ............. *G06N 3/008* (2013.01); *G06N 3/004* (2013.01)
    USPC .......................................................... 706/12
(58) Field of Classification Search
    None
    See application file for complete search history.

(56) References Cited

U.S. PATENT DOCUMENTS

2012/0084237 A1*    4/2012    Hasuo et al. ............... 706/12

OTHER PUBLICATIONS

Terao "Learning-based Intelligence for Socially Assistive Robots", MS Thesis, 2009, pp. 118.*

* cited by examiner

*Primary Examiner* — Li-Wu Chang
(74) *Attorney, Agent, or Firm* — Novick, Kim & Lee, PLLC; Jae Youn Kim

(57) ABSTRACT

An apparatus for the learning emotion of a robot includes an internal state calculation unit for detecting external environment information and calculating an internal state vector value for one point of an internal state coordinate system; an emotion decision processing unit for generating an emotion value within each emotion value group, indicated by the coordinates of the internal state input value of the robot on the coordinate system, as an emotion of the robot; a behavior generation unit for deciding the behavior of the robot based on the decided motion value and making an emotional expression; and an emotion learning unit for generating feedback information on the emotion value, corresponding to one point of the coordinate system, based on the decided emotion value and information on the type of emotion from a user input unit and changing an emotion probability distribution of the coordinate system using the feedback information.

9 Claims, 7 Drawing Sheets

(a)

(b)

(a)

(b)

APPARATUS AND METHOD FOR LEARNING EMOTION OF ROBOT

BACKGROUND

Exemplary embodiments of the present invention relate to an apparatus and method for the learning emotion of a robot, and more particularly, to an apparatus for the learning emotion of a robot and a method for the learning emotion of a robot, which are capable of generating emotions desired by a user through learning.

In general, the emotions of a robot are limited to emotions that are generated in specific positions of an emotion space having a specific number of emotions according to inputs through sensors.

FIG. 1 is a schematic diagram showing a common emotional expression method of a robot.

In order for a robot to express emotions, current emotion values of the robot have to be calculated. Emotion is rarely determined to be one detailed emotion, such as happiness or sadness. Although a human being now feels happy, different emotions, such as surprise and anger, are partially incorporated. That is, an emotional expression is a result into which complex detailed emotions are incorporated. Accordingly, in order to embody a realistic emotional expression through a robot, emotion values applied to the robot can also be expressed by vectors by incorporating a variety of detailed emotions, such as happiness, sadness, surprise, and anger.

In general, in order to express the emotions of a robot as in FIG. 1, a two-dimensional or three-dimensional fixed space is used. An emotion and an emotional expression corresponding to the emotion are mapped to a specific position on the space of the fixed dimension. An emotion value can be represented and calculated as a vector value corresponding to the specific position on the space.

That is, a method of mapping emotions to several points on a vector space, mapping emotional expressions to respective corresponding emotions, selecting one of the emotions that is closest to a specific emotion vector from the several emotions mapped to the vector space when the specific emotion vector is given, and making an emotional expression mapped to the selected emotion has been used.

In other words, the manual mapping of emotions and emotional expression, corresponding to the emotions, to numerous coordinates on the vector space is limited. Thus, in the method of FIG. 1, a small number of coordinates are selected, the emotions corresponding to the respective coordinates are mapped to emotional expression behaviors corresponding to the emotions, an emotion having coordinates that are closest to an emotion vector determined by considering the emotion state of a robot is selected, and a corresponding emotional expression is performed.

For example, if emotion values 1 {happiness 1, sadness 0, surprise 0, anger 0} are set so that it is shown in coordinates 1 on a four-dimensional vector space and emotion values 2 {happiness ¾, sadness ¼, surprise 0, anger 0} and emotion values 3 {happiness ¾, sadness 0, surprise ¼, surprise 0} are closer to the coordinates 1 than to coordinates that represent different emotions, all the emotion values 1, 2, and 3 perform the emotional expressions set in the coordinates 1.

As described above, in the conventional method, even when emotion values internally generated actually are different from each other, only the most similar one emotion value is selected from emotion values corresponding to the coordinates 1 and an emotional expression behavior is selected based on the emotion value of the same coordinates. Accordingly, forms that are represented through an expression organ are the same.

A detailed description is given with reference to FIG. 2. FIG. 2 is a schematic diagram illustrating a conventional process of generating the emotions of a robot from emotion state input values. In FIG. 2, a one-dimensional emotion coordinate system is used, for convenience of description.

In the emotion coordinate system, it is assumed that a basic emotion of happiness is disposed at coordinates 1 and a basic emotion of sadness is disposed at coordinates −1. If an input value is 0.3, a basic emotion that is closest to 0.3 is extracted. In the case of FIG. 2, the basic emotion of happiness is extracted because 0.3 is closer to 1 than to −1. The final emotion of a robot becomes the coordinates 1 because the basic emotion of happiness becomes the coordinates 1 in the emotion coordinate system.

In accordance with the emotion generation method, although an input value is 0.5, the final emotion of the robot will become the coordinates 1 as in a case where the input value is 0.3.

Accordingly, from a viewpoint of an emotional expression apparatus for expressing an eye, a mouth, and a gesture based on the emotions of a robot that are generated in accordance with the emotion generation method, the same coordinates 1 are expressed by an emotion of a robot even when an emotion state input value is 0.3 and 0.5. Accordingly, in most of robots, the emotional expression is made although an input value is different.

However, the conventional robot emotion generation apparatus generates always the same emotion for the same input. If an unwanted emotion is produced according to a user's propensity, there are problems in that the user does not sympathize with the robot and an interest in the robot is reduced by half.

NON-PATENT DOCUMENTS (a) Miwa H., et al., "Effective emotional expressions with expression humanoid robot WE-4RII: integration of humanoid robot hand RCH-1," In Proceedings of 2004 IEEE/RSJ International Conference on Intelligent Robots and Systems (IROS 2004), vol. 3, pp. 2203-2208, 2004.
(b) C. Breazeal, "Function meets style: insights from emotion theory applied to HRI," IEEE Transactions on Systems, Man and Cybernetics, Part C: Applications and Reviews, Vol. 34, no. 2, pp. 187-194, 2004.
(c) Park Jeong-Woo, Lee Hui-Sung, Jo Su-Hun, and Chung Myung-Jin, "Dynamic Emotion Model in 3D Affect Space for a Mascot-Type Facial Robot," In Proceedings of the 2nd Korea Robot Society Annual Conference, 2007.
(d) Christian Becker, Stefan Kopp, and Ipke Wachsmuth, "Simulating the Emotion Dynamics of a Multimodal Conversational Agent," In Proceedings Tutorial and Research Workshop on Affective dialogue Systems, pp. 154-165, 2004.

SUMMARY

An embodiment of the present invention relates to an emotion generation apparatus and an emotion generation method, which enable the learning of a robot and can generate an emotion desired by a user by changing a distribution of emotions disposed on an emotion space through the learning of the user.

In one embodiment, an apparatus for a learning emotion of a robot includes an internal state calculation unit configured to detect external environment information and calculate an internal state vector value, corresponding to one point of an internal state coordinate system, based on the detected external environment information; an emotion decision processing unit configured to generate an emotion value within each emotion value group, indicated by the coordinates of an internal state input value of the robot on the internal state coordinate system, as an emotion of the robot; a behavior generation unit configured to decide a behavior of the robot based on the emotion value decided by the emotion decision processing unit and make an emotional expression based on the decided behavior; an emotion learning unit configured to generate feedback information on the emotion value, corresponding to one point of the internal state coordinate system, based on the emotion value decided by the emotion decision processing unit and information on the type of emotion received from a user input unit and change an emotion probability distribution of the internal state coordinate system using the feedback information. Also, the present invention could have a user input unit configured to input the information on the type of emotion to the emotion learning unit. Here, the emotion probability distribution preferably includes one Gaussian distribution having weight, a central value, and a variance or a Gaussian distribution in which a plurality of the Gaussian distributions is composed.

In particular, the emotion learning unit searches for a Gaussian distribution corresponding to the feedback information using a matching function and changes a Gaussian distribution based on the retrieved Gaussian distribution.

In another embodiment, a method for a learning emotion of a robot includes the steps of detecting, by an internal state calculation unit, external environment information, calculating an internal state vector value corresponding to one point of an internal state coordinate system based on the detected external environment information, and generating an internal state based on the calculated internal state vector value; deciding, by an emotion decision processing unit equipped with an emotion model in which an emotion probability distribution for j types of emotions is formed on an n-dimensional internal state coordinate system, an emotion value of the robot by matching an input value of the internal state calculation unit with the internal state coordinate system; deciding, by a behavior generation unit, a behavior of the robot based on the emotion value decided by the emotion decision processing unit and making an emotional expression based on the decided behavior; and generating, by an emotion learning unit, feedback information on the emotion value corresponding to one point of the internal state coordinate system based on the emotion value decided by the emotion decision processing unit and information on the type of emotion received from a user input unit and changing an emotion probability distribution of the internal state coordinate system based on the feedback information.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Hereinafter, embodiments of the present invention will be described with reference to accompanying drawings.

Figure 1:
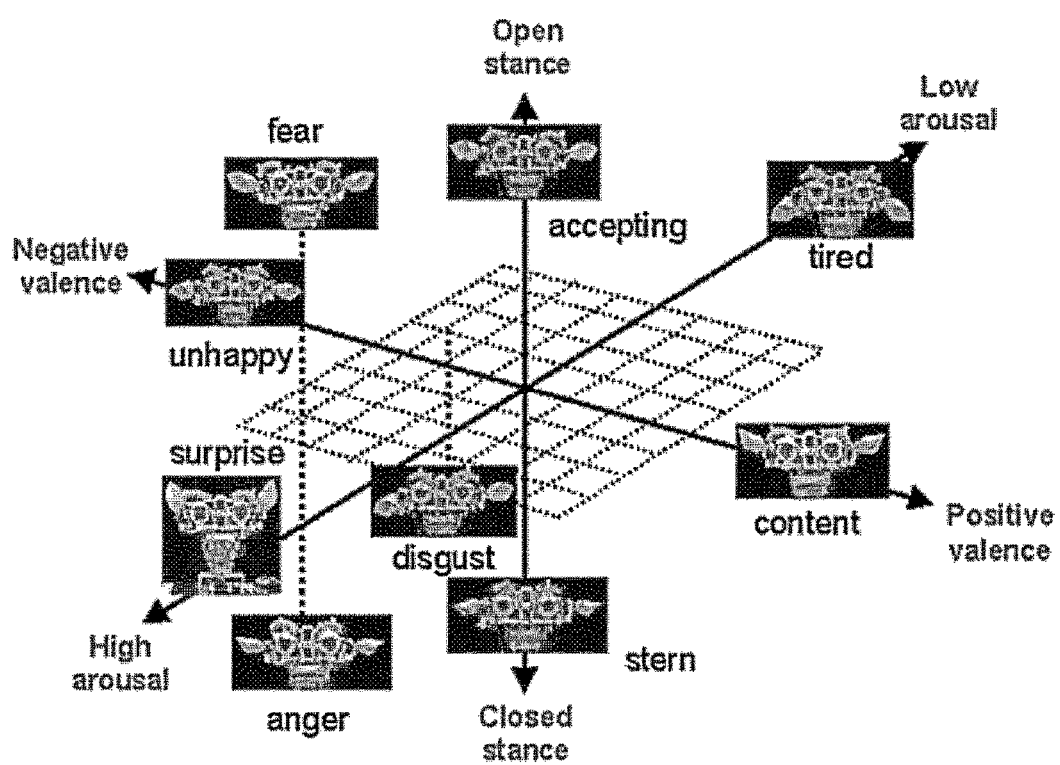
FIG. 1 is a schematic diagram showing a common emotion model of a robot.
Figure 2:
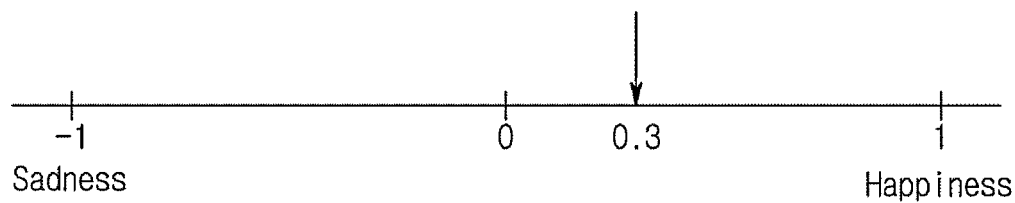
FIG. 2 is an embodiment illustrating a process of generating the emotions of a robot from emotion state input values on an emotion space in the prior art.
Figure 3A:
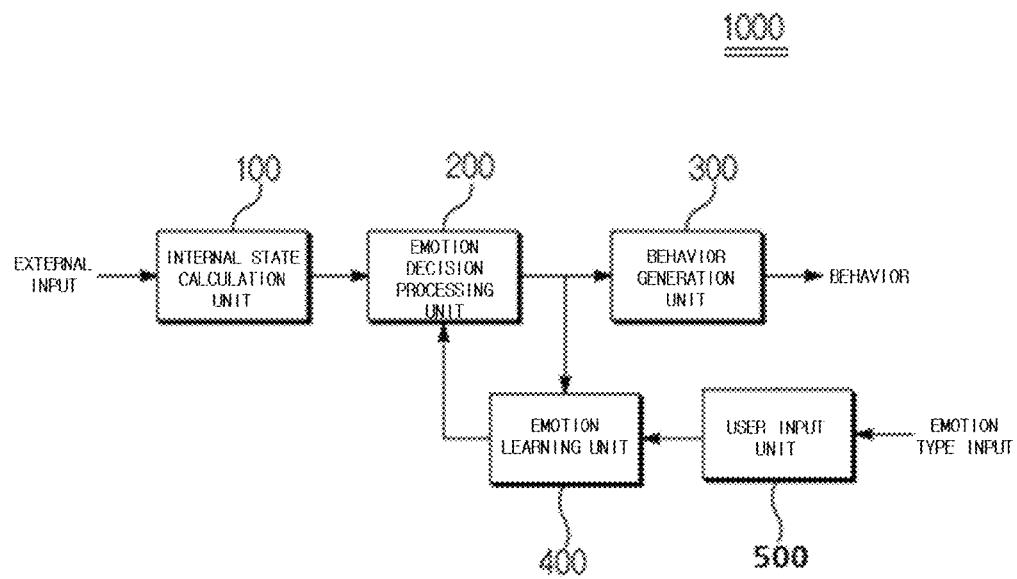
FIG. 3A is a diagram showing the construction of an apparatus for the learning emotion of a robot in accordance with the present invention.
Figure 3B:
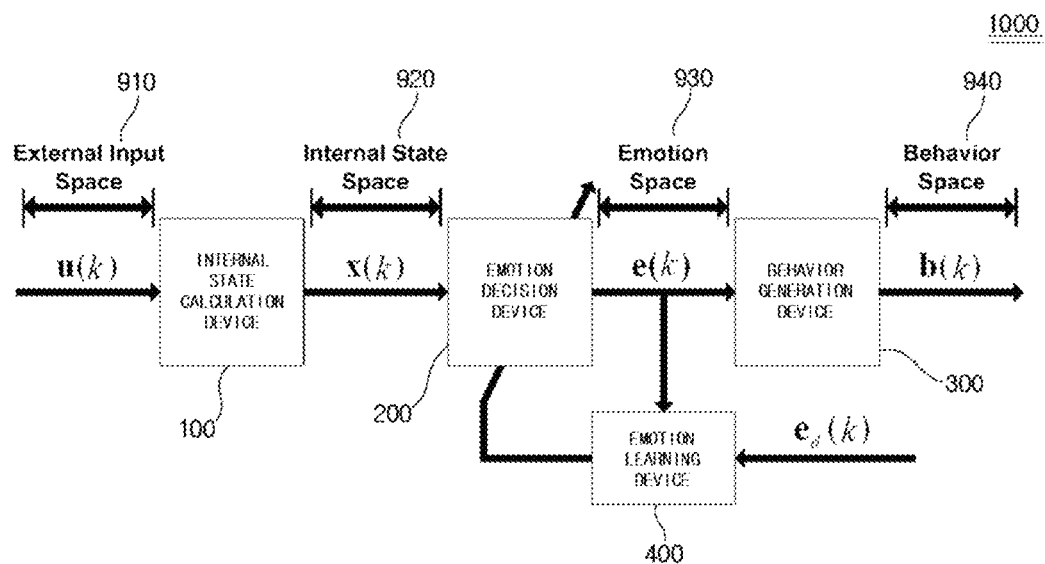
FIG. 3B is a diagram showing the construction of each of the elements of the apparatus for the learning emotion of a robot in accordance with the present invention and a space between the elements.

FIGS. 3A and 3B are diagrams showing the construction of an apparatus 1000 for the learning emotion of a robot using a generative probability model to which the present invention can be applied.

First, an overall construction of the apparatus 100 for the learning emotion of a robot is described with reference to FIGS. 3A and 3B.

As shown in FIGS. 3A and 3B, the apparatus 1000 for the learning emotion of a robot includes an external input space 910, an internal state space 920, an emotion space 930, and a behavior space 940, that is, four spaces for learning artificial emotions based on the generative probability model; an internal state calculation unit 100, an emotion decision processing unit 200, a behavior generation unit 300, and an emotion learning unit 400, that is, four elements for performing a mapping process; and a user input unit 500.

First, the external input space 910 is formed of a vector space using pieces of externally detected information, such as a facial expression, a gesture, and a tone.

The internal state space 920 is formed of the five-factor model of personality. The five factors of personality include openness to experience, conscientiousness, extraversion, agreeableness, and neuroticism.

The internal state space 920 may be formed of an emotion space of a one-dimensional or higher using one or more of the five factors of personality, and the emotion space may be configured by combining one or more of the five factors of personality and other factors. Furthermore, an emotion space configured using some factors, such as an emotion space configured using other factors without using the five factors of personality, may be applied.

The internal state space 920 is a concept that is introduced in order to configure a basic internal state in which a robot having character or emotions responds to a specific external input. More particularly, even when there is the same external input or stimulus, each human being differently responds according to a growth background or environment, that is, has a different emotion, and eventually expresses his emotion externally based on the different emotion.

For example, if an external stimulus of the same extent is inputted to a human being who has long been exposed to a violent environment and a human being who has not been exposed to a violent environment, there is a good possibility that the former may have a very sensitive personality in his internal state and may generate an emotion based on this state, whereas there is a good possibility that the latter may do not have this personality.

The emotion space 930 is formed of a vector space based on the degree of the amount of emotions, such as happiness, surprise, sadness, love, dislike, fear, and anger.

The behavior space 940 is formed of a vector space based on the amount of a unit behavior that indicates the smallest behavior, such as the smiling mouth and an opened mouth of an emotional expression organ, such as a mouth, an eye, or the head.

The internal state calculation unit 100 of FIGS. 3A and 3B calculates an internal state as an internal process, performs mapping from the external input space 910 to the internal state space 920, and defines the internal state space 920 and a dimension. The internal state means one point within the internal state space 920 that uses external inputs.

The internal state space 920 according to the prior art is randomly modified although it is based on psychological researches. Furthermore, the internal process has to be associated with a state space because a result of the internal process is one point on the internal state space 920. However, the prior art is problematic in that the internal process is randomly connected with the internal state space according to a user's experience.

In the present invention, the internal state space 920 is configured based on the five-factor model of personality, that is, researches of psychology. The five-factor model of personality has been introduced to describe a human being character psychologically. The five-factor model of personality is already known to those skilled in the art, and thus a detailed description thereof is omitted.

The internal process can be configured using the Revised NEO Personality Inventory (NEO-PI-R), that is, a method of measuring the five-factor model of personality. As described above, the internal process may be configured using a thing different from the NEO-PI-R. The NEO-PI-R is described in detail below.

The emotion decision processing unit 200 of FIGS. 3A and 3B is an emotion decision process, and it selects an emotion vector that is mapped from the internal state space 920 to the emotion space 930.

In the prior art, it is difficult to incorporate a difference in the age or cultural background because the internal state space 920 is disposed in a plurality of fixed areas for classifying emotions. Furthermore, there is a problem in that the definition and number of basic emotion are different for every psychological research.

In the present invention, however, an emotional probability method using a Gaussian Mixture Model (GMM) is set on an emotion space, and the emotional probability method is update in response to user feedback. Unlike in a case where only one emotion is selected as in the prior art, in the present invention, an emotion vector is selected based on probability values that are distributed over all emotions.

The behavior generation unit 300 of FIGS. 3A and 3B is a behavior generation process performs mapping from the emotion space 930 to the behavior space 940 in order to generate the behaviors of a robot.

In the prior art, the act or behavior of a robot is selected using predetermined 1:1 mapping between a behavior and an emotion. Accordingly, a robot expresses always the same behavior when the same external input is given. Furthermore, since only one emotion is incorporated into one generated behavior, a robot can express only a simple and monotonous behavior.

In the present invention, in order to decide the most probability behavior of a robot, a concept of a behavior generation process for generating a variety of behaviors into which a unit behavior and a probability emotion value are incorporated is introduced.

The generation of the internal state from the emotion decision process based on the generative probability model is described.

First, in relation to the generation of the internal state, as in FIGS. 3A and 3B, the emotion system 1000 using the generative probability model of the present invention includes two processes: an internal process and an emotion decision process having a learning method.

In the internal process, the external input space 910 is mapped to the internal state space 920, and an internal state is generated as one point within the internal state space 920. The internal process is modeled using the Revised NEO Personality Inventory (NEO PI-R), that is, a method developed in order to measure the five-factor model of personality.

As described above, the five-factor model of personality is a model that describes a person's character, and it includes five aspects of personalities used to describe a person's character.

The five factors include openness to experience, conscientiousness, extraversion, agreeableness, and neuroticism.

Furthermore, the NEO PI-R is a psychological character test method and is used as a method of measuring the five-factor model of personality. A NEO PI-R experiment includes six lower factors (facets) that are known as the facets of the respective factors of the five-factor model of personality. The six lower factors are measured by the NEO PI-R experiment.

In NEO-PI-R, six lower factors are included in each upper factor as below.

Openness to experience: fantasy, aesthetics, feelings, actions, ideas, and values Conscientiousness: competence, order, dutifulness, achievement striving, self-discipline, and deliberation Extraversion: warmth, gregariousness, assertiveness, activity, excitement seeking, and positive emotion Agreeableness: trust, straightforwardness, altruism, compliance, modesty, and tender mindedness Neuroticism: anxiety, hostility, depression, self-consciousness, impulsiveness, and vulnerability to stress In FIGS. 3A and 3B, $u(k)$ is defined as an external input vector. The factors of the external input vector indicate external input states, such as a facial expression, a gesture, and turn of words. Furthermore, the external input vector is placed in the external input space 910 of an S dimension including S external inputs.

$x(k)$ is defined as an internal state vector, and the factors of the internal state vector indicate the state of the five factors: openness to experience, conscientiousness, extraversion, agreeableness, and neuroticism on the internal state space 920 based on the five-factor model of personality.

u(k) becomes the input of the internal process, and x(k) becomes the output of the internal process. If there is no external input for a specific time, an internal state converges on 0 in which an emotion state is neutrality.

An emotion decision process is a process of being mapped from the internal state space 920 to the emotion space 930. In the emotion decision process, an emotion vector, that is, one point existing on the emotion space 930 is generated. In the present invention, emotion probability distributions distributed on the internal state space 920 are set, and the emotion probability distributions are updated by learning.

e(k) is defined as an emotion vector, and a factor that forms the emotion vector indicates the probability size of an emotion indicated by the factor. The emotion space 930 may be a J dimension, and the J indicates the number of emotions.

x(k) becomes the input of the emotion decision process, and e(k) becomes the output of the emotion decision process. When x(k) is inputted to the emotion decision process, each emotion probability is determined using emotion probability distributions distributed on the internal state space 920, and e(k) is determined to have a probability for all emotions.

The behavior generation unit 300 performs an emotional expression according to an emotion vector decided by the emotion decision processing unit 200. The behavior generation unit 300 can perform the facial expression processing and voice output processing of a robot and behavior processing using the arm, leg, and body of a robot. Meanwhile, the behavior generation unit 300 is not a principle aspect of the present invention, and thus a detailed description thereof is omitted.

The emotion learning unit 400 generates feedback information corresponding to an emotion vector, that is, one point existing on the emotion space 930, based on an emotion vector decided by the emotion decision processing unit 200 and information on the type of emotion received from the user input unit 500 and changes an emotion probability distribution using the feedback information. That is, the emotion learning unit 400 generates feedback information regarding an emotion value that corresponds to one point of the internal state coordinate system and changes the emotion probability distributions of the internal state coordinate system using the feedback information.

The user input unit 500 inputs information on the type of emotion to the emotion learning unit 400.

Figure 4A:
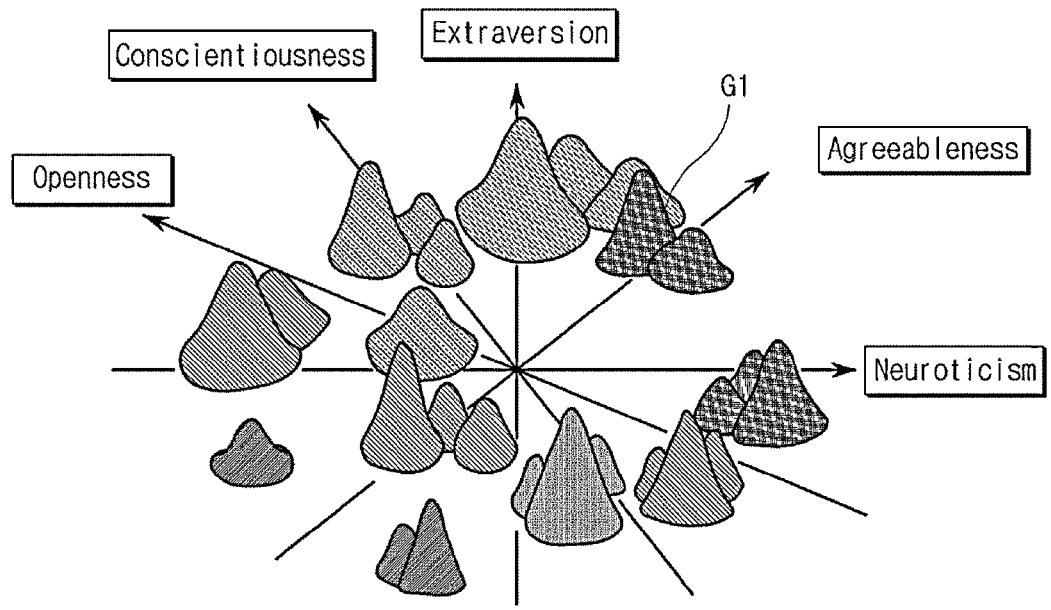
FIG. 4A is a schematic diagram showing emotion probability distributions that can be adopted in an embodiment of the present invention.

FIG. 4A is a schematic diagram showing emotion probability distributions that can be adopted in an embodiment of the present invention.

First, a description is given with reference to FIG. 4A. FIG. 4A illustrates coordinates showing an internal state space. Here, the internal state (openness to experience, conscientiousness, extraversion, agreeableness, and neuroticism) space of a five dimension is configured based on the Five Factor Model (FFM) of psychology. Conical shapes having the same texture shown in FIG. 4A indicate respective emotions. That is, one conical shape indicates one emotion probability distribution. As shown in FIG. 4A, a probability distribution curve indicative of an emotion G1 is placed at a place close to the basic internal state axes, that is, extraversion and agreeableness, of a robot.

Here, one emotion distribution is expressed by one generative probability model having a plurality of Gaussian distributions G1 or Gaussian mode. An emotion space is expressed by a plurality of generative probability models that form a volume space. Here, the volume space can be expressed by a plurality of emotion values which are the greatest in the coordinates of a basic emotion and gradually reduced as farther from the coordinates of the basic emotion. Furthermore, the emotion value is a size indicating an emotion. For example, assuming that there is only a pure emotion of happiness, the size of happiness can be different for the same happiness. As described above, the emotion value is to represent the size of happiness.

The basic emotion is an emotion that is assigned to a robot by a user and can be defined as happiness, sadness, anger, surprise, or fear. The basic emotion is set on the coordinate system of the internal state space of a robot.

An emotion value group can be set in various ways. A shape of a volume space generated as this emotion value group can appear as the personality or propensity of a robot. For example, as shown in FIG. 4A, a cone having the same texture indicates the same emotion, and the shape of each cone can be different for each robot. That is, the shape of each cone can become a personality unique to a robot. Furthermore, if an emotion value is set to have the great at the coordinates of a basic emotion and set to be gradually reduced as farther from the coordinates of the basic emotion when setting an emotion value group, this can be advantageous for a natural emotional expression, but the present invention is not necessarily limited thereto.

Meanwhile, an emotion value group can be generated based on an internal state input value. In order for a robot to make an emotional expression, there must be an initial external stimulus. This stimulus is detected by an emotion-related sensor installed in a robot, and a result of the detection of the sensor is processed into data that can be represented on the internal space state coordinate system of the robot. The processed data can become an internal state input value. Furthermore, a dynamic emotional expression can be made by changing the emotion value group in response to the internal state input value.

The internal state calculation unit 100 functions to detect external environment information, that is, an external stimulus, using the emotion-related sensors installed in a robot and to process the detected environment information into data that can be represented on the coordinate system. Here, an external stimulus can include all stimuli which can be recognized by a person, such as voice recognition (a meaning of speech, the volume of sound, etc.), image recognition (person recognition, object recognition, color recognition, etc.), and a variety of sensor values (the position value of a touch sensor, intensity, whether distances collide against each other or not, temperature, humidity, etc.).

In the case of a robot to which a learning ability is assigned, the emotion coordinates of happiness can be changed, added, and deleted by learning. For example, as in FIG. 4B, the coordinates 0.5 of happiness can be added by learning in addition to the coordinates 1 of happiness. In this case, since there are two identical emotions, one emotion value group can be represented by merging the two identical emotions with each other. The mergence of two identical emotions is described in detail later in relation to the emotion learning unit 300.

Figure 4B:
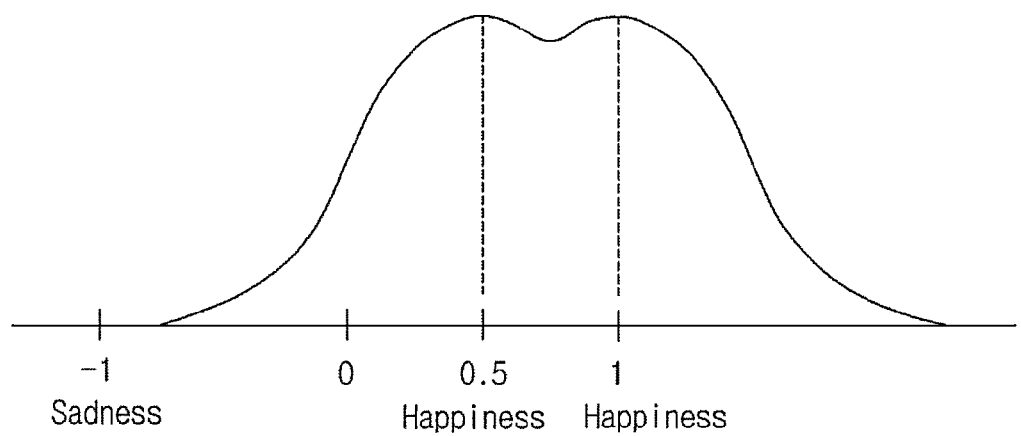
FIG. 4B is a diagram showing an emotion model having an emotion probability distribution in which two Gaussian distributions for the same emotion are composed on a one-dimensional emotion space in accordance with an embodiment of the present invention.

FIG. 4B shows a case where each emotion value group forms a Gaussian curve around the coordinates of a basic emotion and shows the state in which the Gaussian curve of the coordinates of happiness 1 and the Gaussian curve of happiness 0.5 that is newly added by learning are merged with each other according to the Gaussian Mixture Model (GMM).

Here, the weight of a Gaussian distribution must always satisfy 1 for each emotion. For example, if there is only one Gaussian distribution for an emotion A, the weight of the Gaussian distribution is 1. Likewise, if there are two Gaussian distributions for an emotion A, the two Gaussian distributions can have different weights, but the sum of the weights must always satisfy 1.

As described above, a set of the emotion values of each emotion value group that are indicated by the coordinates of the internal state input value of a robot on the coordinate system of the internal state space can be generated as an emotion of the robot.

Meanwhile, in the present invention, an emotion value group is illustrated using a Gaussian curve, but it can be represented by a variety of curves that satisfy a condition of a volume space described above, such as a triangle. That is, as another embodiment, an emotion probability distribution can be formed of a distribution having a variety of shapes (e.g., a circular distribution, a quadrilateral distribution, a triangular distribution, and a semicircular distribution) not the Gaussian distribution.

As described above, other distributions other than the Gaussian distribution can be applied. In this case, an equation different from a Gaussian distribution equation can be applied, but it has the same principle as the Gaussian distribution equation. In this specification, a detailed description of equations regarding other distributions is omitted.

If a Gaussian curve having the same distribution around a central value (e.g., an emotion value for a basic emotion) is used, an emotion vector that indicates an emotion of a robot can be easily calculated by uniformly forming a distribution of emotion values that center around a basic emotion in the emotion coordinate system of the robot, but the present invention is not limited thereto.

The emotion decision processing unit 200 calculates an emotion value, that is, an output value, by applying an emotion state input value, that is, an input value, to an emotion model.

Figure 4C:
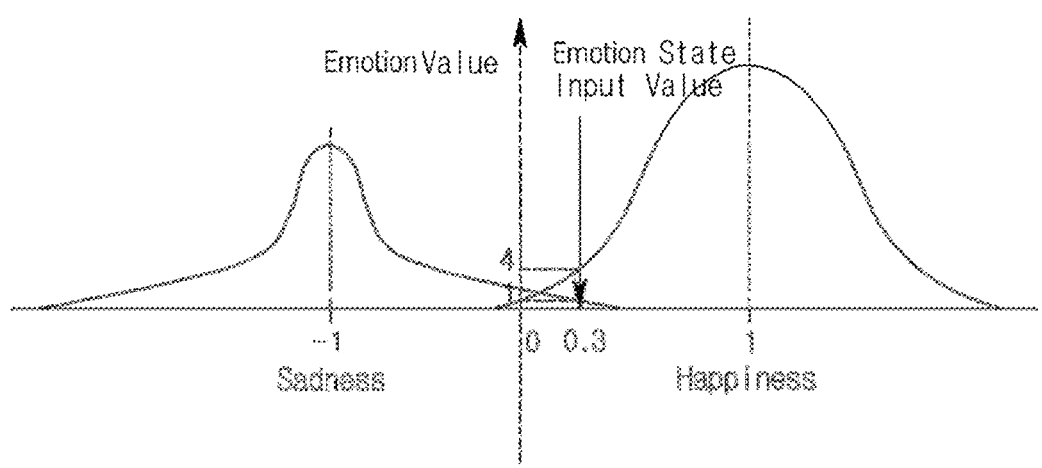
FIG. 4C is a diagram showing an emotion model having two emotion probability distributions for emotions on a one-dimensional emotion space in accordance with an embodiment of the present invention.

FIG. 4C is a diagram showing an emotion model having two emotion probability distributions for different emotions on a one-dimensional emotion space in accordance with an embodiment of the present invention and is a schematic diagram illustrating the operation of the emotion decision processing unit 200. The emotion model is described using an emotion curve placed on the one-dimensional internal state space as shown in FIG. 4C, for convenience of description.

In FIG. 4C, the coordinates 1 of happiness, that is, a basic emotion, and the coordinates −1 of sadness, that is, another basic emotion, are assigned on the one-dimensional coordinates, and an emotion probability distribution that forms a Gaussian curve is assigned to each of the basic emotions.

If an internal state input value is 0.3, the coordinates of happiness 1 become an emotion of a robot in the prior art. In accordance with the present invention, {4, 1}, that is, a set of the emotion values of each emotion value group that is indicated by the coordinates of 0.3 becomes an emotion of a robot. For this expression, order of the elements of the set must be previously set. The present embodiment illustrates a case where order of the elements is set as {the emotion value of happiness, the emotion value of sadness}.

In accordance with the present invention, a mixture emotion in which the size of the emotion of happiness is 4 and the size of the emotion of sadness is 1 can be reliably generated without expressing an emotion of a robot using the coordinates 1 simply indicative of happiness. Here, since the mixture emotion is changed according to the shape of a Gaussian curve, the Gaussian curve forms the personality of the robot.

Furthermore, if one internal state input value indicates a plurality of input values in one emotion probability distribution according to a dimension, one emotion value can be extracted by selecting the greatest value, the smallest value, or a value close to the mean. As a result, if the internal state coordinate system is extended to a plurality of dimensions, only one input value indicated by an internal state input value has only to be extracted for each internal state. Meanwhile, emotion values of a set, that is, each factor of a mixture emotion, can be probabilistically represented with consideration taken of the convenience of a robot emotion expression apparatus using the emotions of the robot as inputs. A probabilistic expression means that an emotion value is represented by a percentage or a fraction of the sum total 1. For example, if an emotion of a robot is {4, 1} in the above example, the emotion of the robot becomes {80, 20} when it is represented by a percentage and becomes {4/5, 1/5} when it is represented by a fraction of the sum total 1.

The emotion learning unit 400 is an element for learning an emotion model. The emotion learning unit 400 receives the emotion vector e(k), that is, the output value of the emotion decision processing unit 200, and emotion type information $e_d(k)$ through the user input unit 500 as input value and outputs feedback information x(k+1) for changing the weight, central value, and variance of each Gaussian distribution on the emotion model as an output value. That is, learning is to change Gaussian distributions distributed on the emotion space, and it has a meaning that the weight, central value, and variance of a Gaussian distribution are changed. In particular, the emotion learning unit 400 searches for a Gaussian distribution, corresponding to the feedback information, using a matching function and changes a Gaussian distribution based on a result of the retrieved Gaussian distribution.

As a preferred embodiment, when an input 'to say I love you with open arms' is inputted to apparatus 1000 for the learning emotion of a robot in accordance with the present invention the 1000 in a time k, a user who has seen the input can learn 'happiness'. When 'happiness' is inputted to the emotion learning unit 400 as the type of emotion through the user input unit 500, a Gaussian distribution around a state vector can be learnt according to a set method.

The operation of the apparatus 1000 for the learning emotion of a robot according to the present invention is described below in the form of equations.

1) Definition of the Internal State Vector x(k)

Figure 5A:
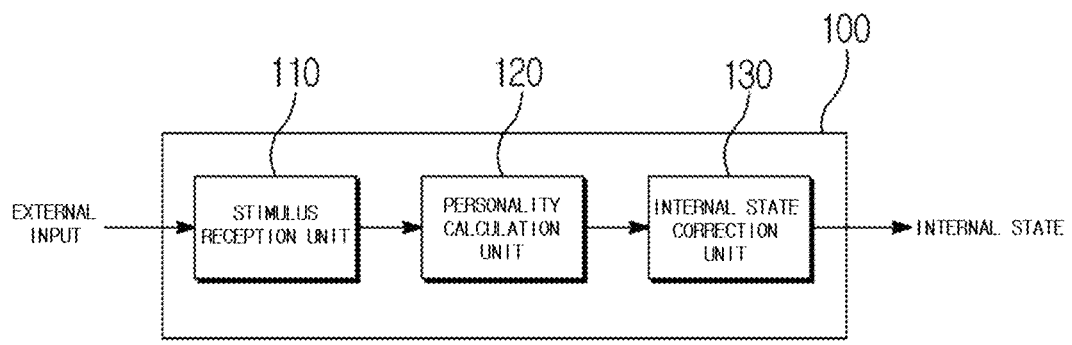
FIG. 5A is a conceptual diagram showing an apparatus for calculating an internal state in accordance with the present invention.
Figure 5B:
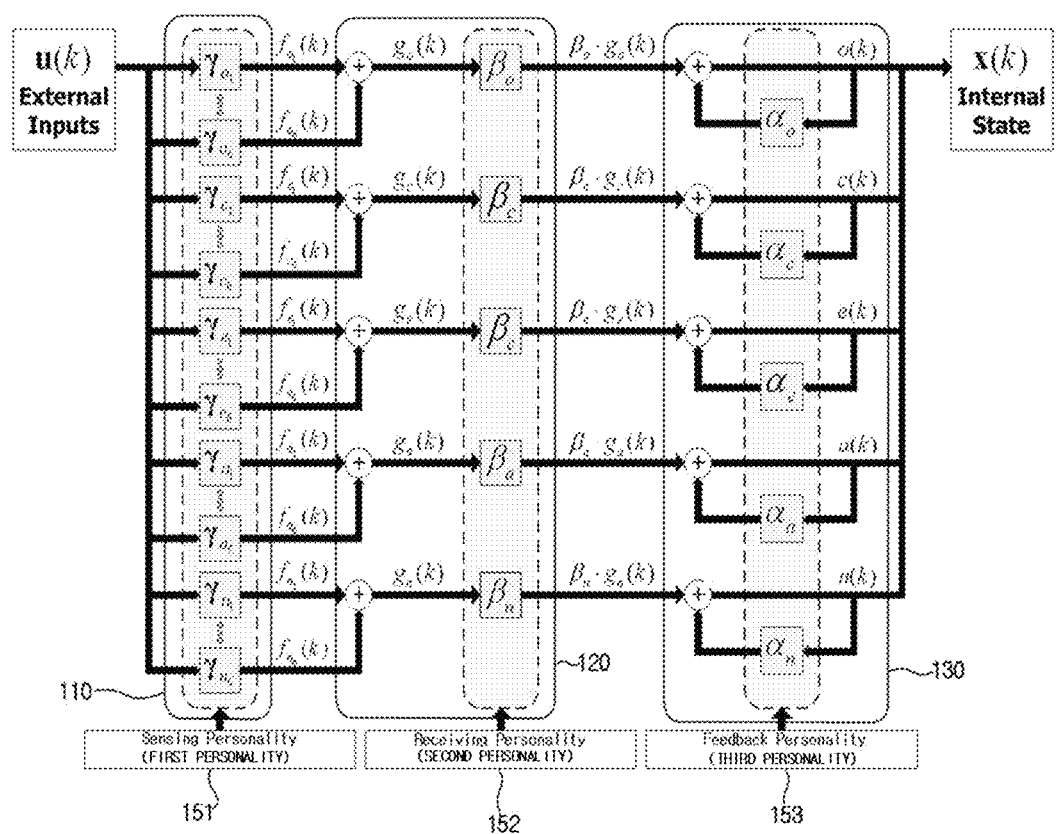
FIG. 5B is a conceptual diagram showing a method of calculating an internal state in accordance with the present invention.

FIGS. 5A and 5B show the internal process that uses the NEO PI-R. The process of FIGS. 5A and 5B is modeled using the NEO PI-R, that is, a method of measuring the five-factor model of personality used in the internal state space 920.

Referring to FIGS. 5A and 5B, an operation for an internal state is performed in order of the calculation of facet value vectors for the personality factors, the calculation of personality factor values for the personality factors, and the calculation of the internal state.

Referring to FIGS. 5A and 5B, $u(k) \in \{0,1\}^s$ is determined by an external input. Here, S indicates the number of external inputs. The value of an $i^{th}$ factor within u(k), that is, the external input, indicates whether an $i^{th}$ sensor operates or not. If the $i^{th}$ sensor operates, the external input indicates 1. If the $i^{th}$ sensor does not operate, the external input indicates 0.

Here, $i \in \{1, 2, \ldots, S\}$.

An input vector is processed by a dynamic system having three types of personality parameters:

A facet parameter 151 (i.e., a first personality): $\Gamma_o, \Gamma_c, \Gamma_e, \Gamma_a, \Gamma_n \in R^{6 \times s}$ A personality factor parameter 152 (i.e., a second personality) $\beta_o, \beta_c, \beta_e, \beta_a, \beta_n \in R$, A durability parameter 153 (i.e., a third personality): $\alpha_o, \alpha_c, \alpha_e, \alpha_a, \alpha_n \in [0,1]$ o, c, e, a, and n, that is, the subscripts of the respective parameters, indicate openness to experience, conscientiousness, extraversion, agreeableness, and neuroticism.

The durability parameter 153 (i.e., the third personality) indicates durability for each of the five factors of personality according to the five-factor model of personality, and the personality factor parameter 152 (i.e., the second personality) indicates the degree of sensitivity for each of the five factors of personality.

The facet parameter indicates the degree of sensitivity of six lower factors that are included in each of the five factors of personality. The facet parameter 151 (i.e., the first personality) can become a total of thirty because each of the five factors of personality includes six lower factors.

For example, the facet parameter 151 (i.e., the first personality) for openness to experience, that is, one of the five factors of personality, can be represented as follows.

$$\Gamma_o = [\gamma_{o1}, \gamma_{o2}, \gamma_{o3}, \gamma_{o4}, \gamma_{o5}, \gamma_{o6}]^T, \text{and } \gamma_{o1}, \gamma_{o2}, \gamma_{o3}, \gamma_{o4}, \gamma_{o5}, \gamma_{o6} \in R^s.$$

The facet parameter 151 (i.e., the first personality) of each of the remaining four factors can be represented likewise.

Next, in relation to the calculation of the facet value vectors for the five factors of personality, an input vector is converted into the facet value vectors of the five factors of personality, that is, openness to experience, conscientiousness, extraversion, agreeableness, and neuroticism, using corresponding facet parameters.

For example, $f_o(k)$ (wherein $f_o(k) \in R^6$), that is, a facet value vector for openness to experience, is determined as follows.

$$f_o(k) = \gamma_o u(k), \text{ and } f_o(k) = [f_{o1}(k), f_{o2}(k), f_{o3}(k), f_{o4}(k), f_{o5}(k), f_{o6}(k)]^T.$$

$f_c(k)$, $f_e(k)$, $f_a(k)$, and $f_n(k)$, that is, respective facet value vectors for the remaining four personality factors, are determined likewise.

Next, in relation to the calculation of the personality factor values, a facet value vector can be calculated as a personality factor value by adding six facet values.

For example, $g_o(k)$ (wherein $g_o(k) \in R$), that is, a factor value for openness to experience, is determined as follows.

$g_o(k) = 1_6^T f_o = 1_6^T \Gamma_o u(k)$, and $1_6$ is a 6×1 vector that is filled with 1.

$g_c(k)$, $g_e(k)$, $g_a(k)$, and $g_n(k)$, that is, respective personality factor values for the remaining four personality factors, are determined likewise.

Finally, in relation to the calculation of the internal state, the durability parameter, the personality factor parameter, and the past internal state value are converted into internal state values.

For example, o(k+1) for openness to experience is determined by a state equation below.

$$o(k+1) = \alpha_o o(k) + \beta_o g_o(k)$$

c(k+1), e(k+1), a(k+1), and n(k+1) can be determined likewise.

That is, a current internal state value is calculated by adding $\beta_o g_o(k)$, that is, a current calculated personality factor value, to a value obtained by multiplying a just-before internal state by $\alpha_o$, that is, a durability parameter indicating the durability of the internal state.

In relation to the total internal state value, the entire internal state dynamics can be represented by a state equation below.

$$x(k+1) = Ax(k) + Bu(k) \quad \text{[Equation 1]}$$
$$x(k) = [o(k) \; c(k) \; e(k) \; a(k) \; n(k)]^T \in R^5$$

$$A = \begin{bmatrix} \alpha_O & 0 & 0 & 0 & 0 \\ 0 & \alpha_C & 0 & 0 & 0 \\ 0 & 0 & \alpha_E & 0 & 0 \\ 0 & 0 & 0 & \alpha_A & 0 \\ 0 & 0 & 0 & 0 & \alpha_N \end{bmatrix} \in R^{5 \times 5}$$

$$B = \begin{bmatrix} \beta_o & 1_6^T & \Gamma_o \\ \beta_c & 1_6^T & \Gamma_o \\ \beta_e & 1_6^T & \Gamma_o \\ \beta_a & 1_6^T & \Gamma_o \\ \beta_n & 1_6^T & \Gamma_o \end{bmatrix} \in R^{5 \times S} \quad \text{[Equation 2]}$$

Furthermore, all the five upper factors according to the NEO PI-R have been used, but the present invention is not limited thereto. One or more of the five upper factors may be used. Furthermore, all the five lower factors included in the upper factors need not to be used, and one or more of the five lower factors may be used at need. In this case, the dimension value of an internal state can be changed.

2) Definition of the Emotion Vector e(k), that is, the Emotion Value of a Robot

The final emotion is not represented by one emotion value, but is generated as a mixture emotion into which the probability values of some emotion values are incorporated. The mixture emotion becomes the emotion vector e(k). If J emotions are used, the emotion vector e(k) can be represented by an emotion equation 1 of a robot below.

$$e(k) = [P(e_1|x(k))P(e_2|x(k)) \ldots P(e_j|x(k)) \ldots P(e_J|x(k))]^T \quad \text{[Equation 1]}$$

In Equation 1, J is the number of basic emotions, and $e_j$ is the emotion value of a $j^{th}$ basic emotion. For example, $e_1$=happiness, $e_2$=surprise, $e_3$=sadness, $e_4$=love, etc. [ ]$^T$ is a transposed matrix and it can be deleted because an expression method is one.

3) Setting of the Emotion Probability Distribution $P(x(k)|e_j)$

A probability distribution for each basic emotion is disposed on the internal state coordinate system. The probability distribution for each basic emotion uses the Gaussian Mixture Model (GMM). If the GMM is used, a distribution of each basic emotion can be made dynamic and each emotion value can be calculated independently. In an n-dimensional internal state coordinate system, an emotion probability distribution (an emotion distribution, an emotion value group) $P(x(k)|e_j)$ for a $j^{th}$ basic emotion is determined as in Equation 2 below.

$$P(x(k)|e_j) = \sum_{m=1}^{M_j(k)} \omega_{j,m}(k) \cdot \eta\left(x(k) \mid \mu_{j,m}(k), \sum_{j,m}(k)\right) \quad \text{[Equation 2]}$$

In Equation 2, $$\eta\left(x(k) \mid \mu_{j,m}(k), \sum_{j,m}(k)\right) = \frac{1}{(2\pi)^{\frac{n}{2}} \left\|\sum_{j,m}(k)\right\|^{\frac{1}{2}}} \cdot \exp$$

$$\left\{-\frac{1}{2}[x(k)-\mu_{j,m}(k)]\sum_{j,m}^{T-1}(k)[x(k)-\mu_{j,m}(k)]\right\}$$

Furthermore, $\omega_{j,m}(k)$ is the weight of an $m^{th}$ Gaussian distribution or Gaussian mode of the $j^{th}$ emotion distribution in a time k, $M_j(k)$ is the number of Gaussian modes having the $j^{th}$ emotion distribution in the time k, $\mu_{j,m}(k)$ is the central value of an $m^{th}$ Gaussian mode of the $j^{th}$ emotion distribution in the time k, $\Sigma_{j,m}(k)$ is the bandwidth of the $m^{th}$ Gaussian mode of the $j^{th}$ emotion distribution in the time k, and x(k) is an emotion state input value in the time k. The Gaussian mode means one Gaussian curve.

4) Calculation of $P(e_j|x(k))$, that is, the Probabilistic Expression of an Emotion Value The probabilistic expression (i.e., probability value) of each emotion value can be calculated as in Equation 3 using Bayes' rule. Here, $P(e_j|x(k))$, that is, the probability value of a $j^{th}$ emotion, can be used as a posterior probability.

$$P(e_j | x(k)) = \frac{P(x(k) | e_j)P(e_j)}{P(x(k))} \qquad \text{[Equation 3]}$$

$$= \frac{P(x(k) | e_j)P(e_j)}{\sum_{i=1}^{J} P(x(k) | e_i)P(e_i)}$$

In Equation 3, $P(x(k)|e_j)$ can be used as a likelihood function, $P(e_j)$ is a prior probability of $e_j$ and is a probability that each emotion value can be selected (i.e., a probabilistic expression of an emotion value), and the sum of the prior probabilities of respective emotion values is 1.

In accordance with Equations 1 to 3, if J basic emotions are assigned, a J-dimensional emotion vector e(k) having J probability values $P(e_j|x(k))$ is determined. e(k) becomes a mixture emotion into which the J emotion values are incorporated as a probabilistic expression.

5) Calculation of a Matching Function

The Gaussian mode (or a Gaussian distribution) of an emotion for learning using the feedback information x(k+1) of a user on the basis of the vector point of the internal state vector x(k) is searched for as follows.

Here, a matching function ($\text{match}_{j,m}(k+1)$) satisfies Equation 4 below.

$$\text{match}_{j,m}(K+1) = \begin{cases} 1, & \text{if } \|x(k+1)-\mu_{j,m}(k)\| < \delta\sigma_{j,m}(k) \\ 0, & \text{otherwise} \end{cases} \qquad \text{[Equation 4]}$$

In Equation 4, $\text{match}_{j,m}(k+1)$ means the matching function of an $m^{th}$ Gaussian distribution of a $j^{th}$ emotion distribution in the time k+1, $\delta$ indicates a matching range (wherein learning can become fast because lots of Gaussian modes (or Gaussian distributions) are learnt when $\delta$ is great), $\sigma_{j,m}(k)$ indicates a standard deviation of the $m^{th}$ Gaussian distribution of the $j^{th}$ emotion distribution in the time k, x(k+1) indicates the feedback information, and $\mu_{j,m}(k)$ indicates the central value of the $m^{th}$ Gaussian distribution of the $j^{th}$ emotion distribution in the time k.

For reference, the matching function is a function that is defined by a Euclidean Distance calculation method, but may be defined using a Mahalanobis Distance calculation method or a Minkowski Distance calculation method.

6) User Feedback Learning on Probability Distribution

After Gaussian modes are selected as follows using the matching function, a Gaussian distribution is learnt by incorporating a user's intention into the Gaussian distribution.

The learning is divided into two cases. The first case corresponds to a case where a Gaussian mode to be learnt is retrieved through the matching function (6-1), and the second case corresponds to a case where a Gaussian mode to be learnt is not retrieved (6-1).

6-1) $\exists m \in \{1, 2, \ldots, Mj(k)\}$ such that $\text{match}_{j,m}(k+1)=1$ If any one matched Gaussian distribution is retrieved through the matching function, the Gaussian distribution is learnt. Here, a selected, that is, matched Gaussian distribution and an unselected Gaussian distribution, that is, an unmatched Gaussian distribution, are separately learnt.

6-1-1) For Each m Whose $\text{match}_{j,m}(k+1)=1$

Accordingly, the $m^{th}$ Gaussian mode of the selected $j^{th}$ emotion distribution is learnt. In this case, the weight, central value, and variance of the Gaussian distribution are learnt.

In other words, if the matching function is 1, the $m^{th}$ Gaussian distribution of the selected $j^{th}$ emotion distribution is changed so that weight $\omega_{j,m}(k+1)$, a central value $\mu_{j,m}(k+1)$, and a variance $\sigma_{j,m}^2(k+1)$ of Equation 5 below are satisfied on the basis of the feedback information.

$\omega_{j,m}(k+1)=(1-\lambda)\omega_{j,m}(k)+\lambda$ $\mu_{j,m}(k+1)=(1-\rho_{j,m}(k+1))\mu_{j,m}(k)+\rho_{j,m}(k+1)\times(k+1)$ $\sigma_{j,m}^2(k+1)-(1-\rho_{j,m}(k+1))\sigma_{j,m}^2(k)$ $+\rho_{j,m}(k+1)[x(k+1)-\mu_{j,m}(k+1)]^T[x(k+1)-\mu_{j,m}(k+1)]$  [Equation 5]

In Equation 5, $\omega_{j,m}(k+1)$ is the weight of the $m^{th}$ Gaussian distribution of the $j^{th}$ emotion distribution in the time k+1, $\lambda$ is a predetermined basic weight, $\omega_{j,m}(k)$ is the weight of the $m^{th}$ Gaussian distribution of the $j^{th}$ emotion distribution in the time k, $\mu_{j,m}(k+1)$ is the central value of the $m^{th}$ Gaussian distribution of the $j^{th}$ emotion distribution in the time k+1, x(k+1) is the feedback information, $\mu_{j,m}(k)$ is the central value of the $m^{th}$ Gaussian distribution of the $j^{th}$ emotion distribution in the time k, $\sigma_{j,m}^2(k+1)$ is the variance of the $m^{th}$ Gaussian distribution of the $j^{th}$ emotion distribution in the time k+1, $\sigma_{j,m}^2(k)$ is the variance of the $m^{th}$ Gaussian distribution of the $j^{th}$ emotion distribution in the time k, and $[\ ]^T$ is a transposed matrix, and $\rho_{j,m}(k+1)=\lambda\eta(x(k+1)|\mu_{j,m}(k),\Sigma_{j,m}(k))$ In this equation, $\Sigma_{j,m}(k)$ is the bandwidth of the $m^{th}$ Gaussian distribution of the $j^{th}$ emotion distribution in the time k.

6-1-2) For Each m Whose $\text{match}_{j,m}(k+1)=0$

Furthermore, the $m^{th}$ Gaussian mode of an unselected $j^{th}$ emotion distribution is learnt. In this case, only weight is learnt.

In other words, if the matching function is 1, the $m^{th}$ Gaussian distribution of the unselected $j^{th}$ emotion distribution is changed so that the weight ($\omega_{j,m}(k+1)$) of Equation 6 below is satisfied on the basis of the feedback information.

$\omega_{j,m}(k+1)=(1-\lambda)\omega_{j,m}(k)$  [Equation 6]

In Equation 6, $\omega_{j,m}(k+1)$ is the weight of the $m^{th}$ Gaussian distribution of the $j^{th}$ emotion distribution in the time k+1, $\lambda$ is a predetermined basic weight, and $\omega_{j,m}(k)$ is the weight of the $m^{th}$ Gaussian distribution of the $j^{th}$ emotion distribution in the time k.

After the Gaussian distribution is changed, the emotion learning unit 400 normalizes the weights of all the Gaussian distributions corresponding to each emotion. That is, the sum of the weights is made 1.

6-2) matchj,m(k+1)=0 for $\forall m \in \{1, 2, \ldots, M_j(k)\}$

Meanwhile, if a matched Gaussian mode is not retrieved, a new Gaussian mode is set up on the basis of user feedback. Accordingly, the number $M_j(k+1)$ of Gaussian modes included in the $j^{th}$ emotion distribution in the time k+1 becomes $M_j(k+1)=M_j(k)+1$.

In other words, if the matching function is 0 (i.e., there is no matched Gaussian distribution), the emotion learning unit 400 generates a Gaussian distribution that satisfies weight $\omega_{j,M_j(k+1)}(k+1)$, a central value $\mu_{j,M_j(k+1)}(k+1)$, and a variance $\sigma_{j,M_j(k+1)}^2(k+1)$ of Equation 7 below on the basis of the feedback information.

$$\omega_{j,M_j(k+1)}(k+1)=\lambda$$

$$\mu_{j,M_j(k+1)}(k+1)=x(k+1)$$

$$\sigma_{j,M_j(k+1)}^2(k+1)=\sigma^2$$

In Equation 7, $\omega_{j,M_j(k+1)}(k+1)$ is the weight of a Gaussian distribution having the $j^{th}$ emotion distribution in the time k+1, $\lambda$ is a predetermined basic weight, $\mu_{j,M_j(k+1)}(k+1)$ is the central value of the Gaussian distribution having the $j^{th}$ emotion distribution in the time k+1, x(k+1) is the feedback information, $\sigma_{j,M_j(k+1)}^2(k+1)$ is the variance of the Gaussian distribution having the $j^{th}$ emotion distribution in the time k+1, $\sigma^2$ is a predetermined basic variance, and $M_j(k+1)$ is the number of Gaussian distributions included in the $j^{th}$ emotion distribution in the time k+1.

Next, after the Gaussian distribution is generated, the emotion learning unit 400 normalizes the weights of all the Gaussian distribution corresponding to each emotion. That is, the sum of the weights is made 1.

Here, the central value of a Gaussian distribution has a meaning that it has an influence on what emotion, the variance has a meaning that how widely does a corresponding Gaussian distribution have an influence, and the weight has a meaning that how much does a corresponding Gaussian distribution, from among several Gaussian distributions related to the same emotion, have an influence. That is, it means that when the weight is high, the corresponding value of a Gaussian distribution is greatly incorporated.

Accordingly, since a Gaussian distribution in the time k is different from a Gaussian distribution in the time k+1, a different output value, that is, a different emotion value, is generated in response to the same input. Accordingly, an emotion distribution is learnt on the emotion space in the way a user wants through this process. As a result, if this process is repeated, a robot can generate an emotion and make an expression as a user teaches the robot.

Figure 6:
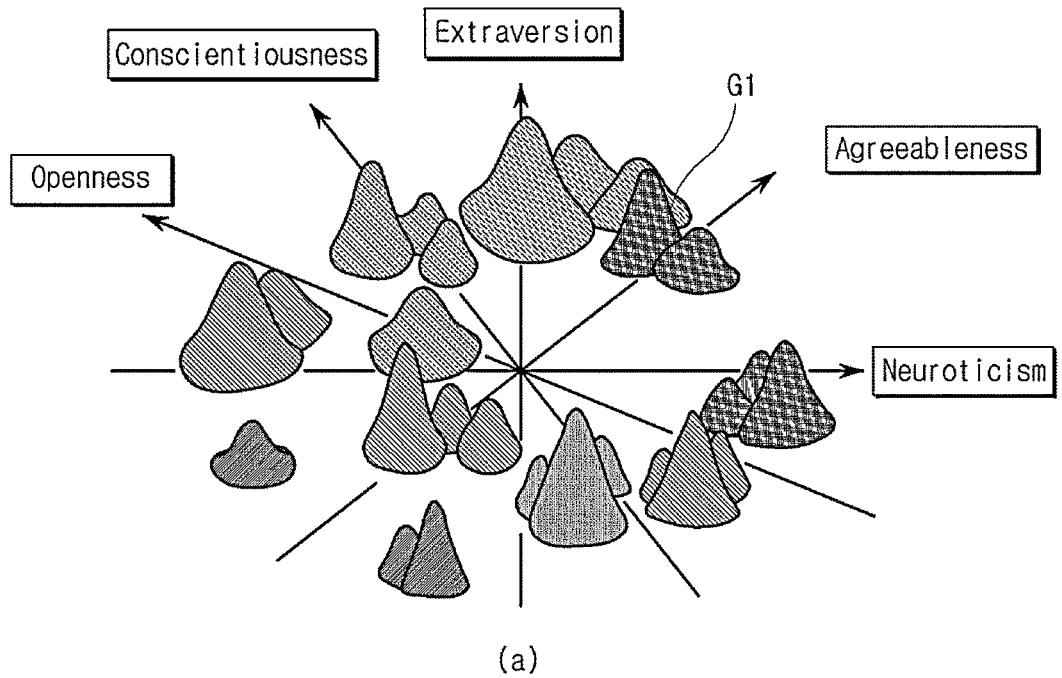
FIG. 6A is a schematic diagram showing an emotion model in accordance with an embodiment of the present invention, and FIG. 6B a schematic diagram showing an emotion model changed by learning.
Figure 6:
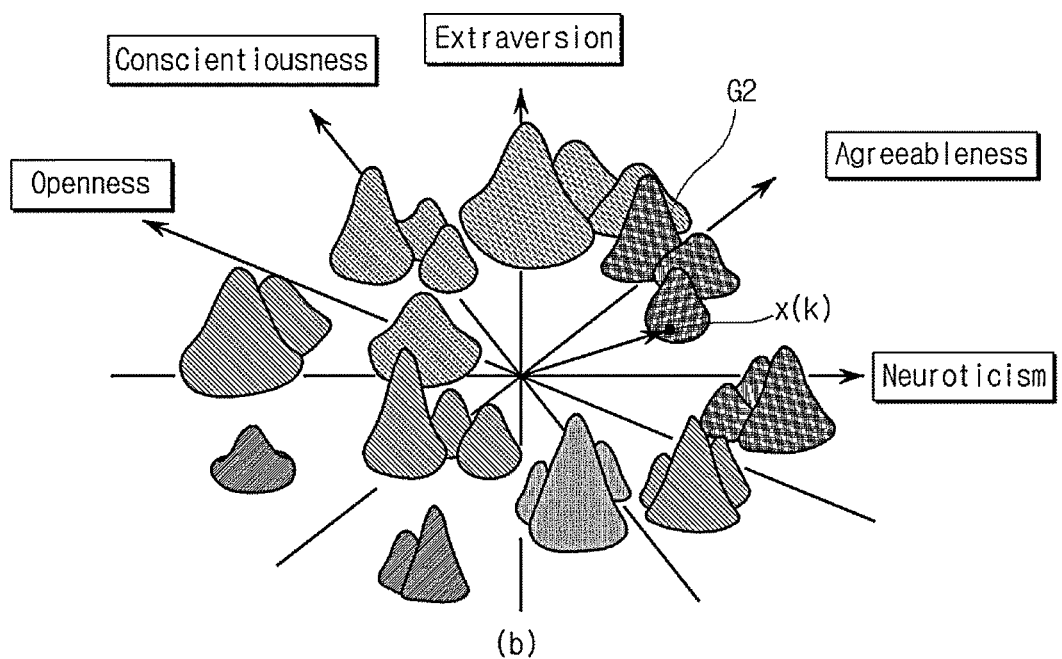

FIG. 6A is a schematic diagram showing an emotion model in accordance with an embodiment of the present invention, and FIG. 6B is a schematic diagram showing an emotion model changed by learning. In FIGS. 6a and 6b, a five-dimensional emotion space was constructed based on the five-factor model of psychology. Accordingly, as in FIG. 6A, a Gaussian distribution G1 before learning was changed into a Gaussian distribution G2 after learning according to the education of a user. Accordingly, assuming that the same state input value is inputted, the emotion decision processing unit 200 decides different emotion values before learning (FIG. 6A) and after learning (FIG. 6B).

Figure 7:
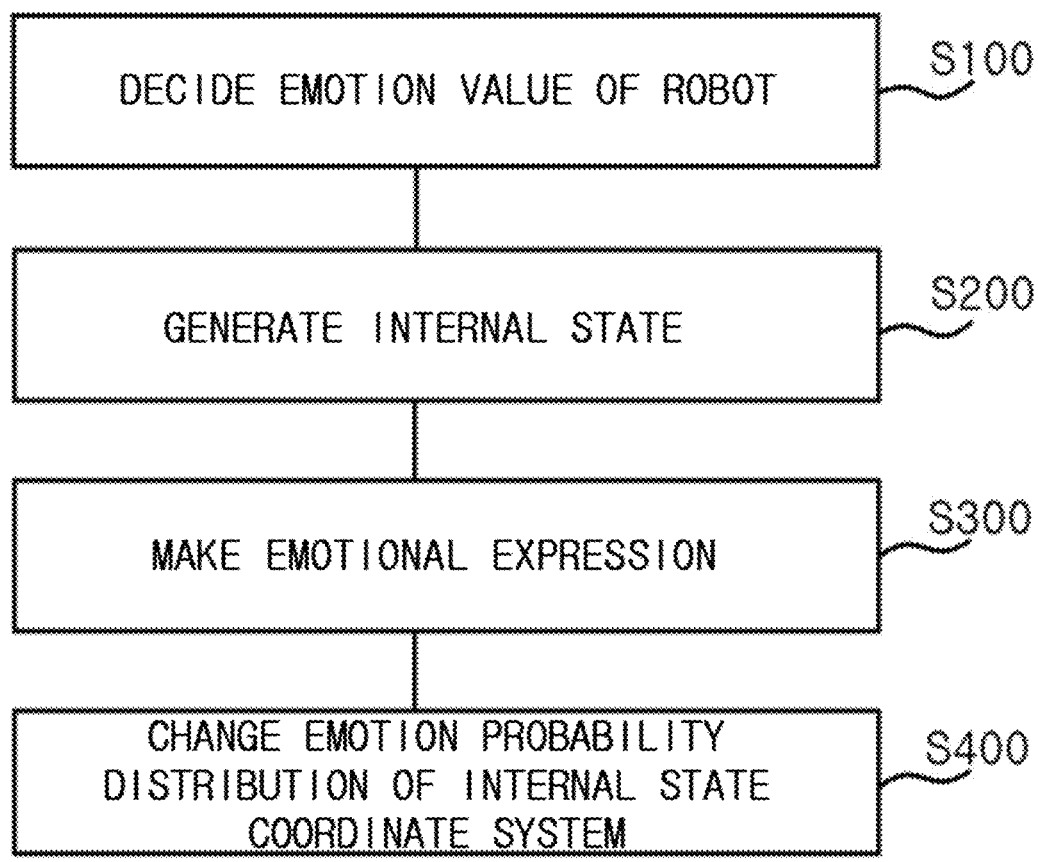
FIG. 7 is a flowchart illustrating a method for the learning emotion of a robot in accordance with an embodiment of the present invention.

Meanwhile, as shown in FIG. 7, a method for the learning emotion of a robot in accordance with the present invention includes (a) a step S100 in which the internal state calculation unit 100 maps the external input space 910 to the internal state space 920, detects external environment information, and generates an internal state as one point within the internal state space 920. That is, in this step, an internal state vector value corresponding to one point of the internal state coordinate system is calculated.

Next, the method for the learning emotion of a robot includes (b) a step S200 in which the emotion decision processing unit 200 equipped with an emotion model in which an emotion probability distribution for several types of emotions is formed on the internal state space decides an emotion vector value of a robot by matching the input value of the internal state calculation unit 100 with the internal state space 920. In the step (b), the emotion decision processing unit 200 can be equipped with an emotion model in which an emotion probability distribution for J types of emotions is formed on an n-dimensional internal state coordinate system.

Next, the method for the learning emotion of a robot includes (c) a step S300 in which the behavior generation unit 300 makes an emotional expression based on the emotion vector value decided by the emotion decision processing unit 200.

Finally, the method for the learning emotion of a robot includes (d) a step S400 in which the emotion learning unit 400 generates feedback information corresponding to an emotion vector, that is, one point that exists on the emotion space 930, based on the emotion vector value decided by the emotion decision processing unit 200 and information on the type of emotion received from the user input unit 500 and changes the emotion probability distribution using the feedback information. That is, in the step (d), feedback information on the emotion vector value corresponding to one point of the internal state coordinate system is generated, and the emotion probability distribution of the internal state coordinate system is changed based on the generated feedback information.

In accordance with the present invention, an emotion desired by a user can be generated by changing a distribution of emotions disposed on an emotion space through the learning of the user. Accordingly, an emotion that sympathizes with a user's propensity can be generated and thus an interest in a robot can be increased.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. An apparatus for a robot capable of learning emotion, the apparatus comprising:
   an internal state calculation unit configured to detect external environment information and calculate an internal state vector value, corresponding to one point of an internal state coordinate system, based on the detected external environment information;
   an emotion decision processing unit configured to generate a set of emotion values within each emotion value group, indicated by coordinates of an internal state input value of the robot on the internal state coordinate system, as an emotion of the robot;
   a behavior generation unit configured to decide a behavior of the robot based on the set of emotion values decided by the emotion decision processing unit and make an emotional expression based on the decided behavior by performing a facial expression processing or a voice output processing of the robot, in which the robot comprises an emotional expression organ including at least one of a mouth, an eye, a head, an arm, a leg, and a body; and an emotion learning unit configured to generate feedback information regarding the set of emotion values, wherein the set of emotion values corresponds to one point of the internal state coordinate system, based on the set of emotion values decided by the emotion decision processing unit and information regarding a type of emotion received from a user input unit and configured to change an emotion probability distribution of the internal state coordinate system using the feedback information, wherein the emotion probability distribution comprises a first plurality of Gaussian distributions, each having weight, a central value, and a variance, or a second Gaussian distribution comprising the first plurality of Gaussian distributions, and wherein the emotion learning unit is configured to retrieve a Gaussian distribution corresponding to the feedback information using a matching function and is configured to change the Gaussian distribution of the emotion probability distribution based on the retrieved Gaussian distribution.

2. The apparatus of claim 1, wherein the matching function $match_{j,m}(k+1)$ satisfies the following equation:

$$match_{j,m}(K+1) = \begin{cases} 1, & \text{if } \|x(k+1) - \mu_{j,m}(k)\| < \delta\sigma_{j,m}(k) \\ 0, & \text{otherwise}, \end{cases}$$

wherein $match_{j,m}(k+1)$ means a matching function of an $m^{th}$ Gaussian distribution of a $j^{th}$ emotion distribution in a time k+1, $\delta$ indicates a matching range, $\sigma_{j,m}(k)$ indicates a standard deviation of the $m^{th}$ Gaussian distribution of the $j^{th}$ emotion distribution in a time k, $x(k+1)$ indicates the feedback information, and $\mu_{j,m}(k)$ indicates the central value of the $m^{th}$ Gaussian distribution of the $j^{th}$ emotion distribution in the time k.

3. The apparatus of claim 2, wherein if the matching function is 1, a Gaussian distribution is changed so that weight $\omega_{j,m}(k+1)$, a central value $\mu_{j,m}(k+1)$, and a variance $\sigma^2_{j,m}(k+1)$ are satisfied based on the feedback information as follows:

$\omega_{j,m}(k+1)=(1-\lambda)\omega_{j,m}(k)+\lambda$;

$\mu_{j,m}(k+1)=(1-\rho_{j,m}(k+1))\mu_{j,m}(k)+\rho_{j,m}(k+1)x(k+1)$;

$\sigma^2_{j,m}(k+1)-(1-\rho_{j,m}(k+1))\rho^2_{j,m}(k)$; and $+\rho_{j,m}(k+1)[x(k+1)-\mu_{j,m}(k+1)]^T[(k+1)-\mu_{j,m}(k+1)]$ wherein $\omega_{j,m}(k+1)$ is the weight of the $m^{th}$ Gaussian distribution of the $j^{th}$ emotion distribution in the time k+1, $\lambda$ is a predetermined basic weight, $\omega_{j,m}(k)$ is the weight of the $m^{th}$ Gaussian distribution of the $j^{th}$ emotion distribution in the time k, $\mu_m(k+1)$ is the central value of the $m^{th}$ Gaussian distribution of the $j^{th}$ emotion distribution in the time k+1, $x(k+1)$ is the feedback information, $\mu_{j,m}(k)$ is the central value of the $m^{th}$ Gaussian distribution of the $j^{th}$ emotion distribution in the time k, $\sigma^2_{j,m}(k+1)$ is the variance of the $m^{th}$ Gaussian distribution of the $j^{th}$ emotion distribution in the time k+1, $\sigma^2_{j,m}(k)$ is the variance of the $m^{th}$ Gaussian distribution of the $j^{th}$ emotion distribution in the time k, and $[\ ]^T$ is a transposed matrix, and $\rho_{j,m}(k+1)=\lambda\eta(x(k+1)|\mu_{j,m}(k),\Sigma_{j,m}(k))$, and wherein $\Sigma_{j,m}(k)$ is a bandwidth of the $m^{th}$ Gaussian distribution of the $j^{th}$ emotion distribution in the time k.

4. The apparatus of claim 2, wherein if the matching function is 1, an $m^{th}$ Gaussian distribution of an unselected $j^{th}$ emotion distribution is changed so that weight ($\omega_{j,m}(k+1)$) is satisfied based on the feedback information as follows:

$\omega_{j,m}(k+1)=(1-\lambda)\omega_{j,m}(k)$, wherein $\omega_{j,m}(k+1)$ is the weight of the $m^{th}$ Gaussian distribution of the $j^{th}$ emotion distribution in the time k+1, $\lambda$ is the predetermined basic weight, and $\omega_{j,m}(k)$ is the weight of the $m^{th}$ Gaussian distribution of the $j^{th}$ emotion distribution in the time k.

5. The apparatus of claim 3, wherein the emotion learning unit normalizes weights of all Gaussian distributions corresponding to each emotion after the Gaussian distribution is changed.

6. The apparatus of claim 4, wherein the emotion learning unit normalizes weights of all Gaussian distributions corresponding to each emotion after the Gaussian distribution is changed.

7. The apparatus of claim 2, wherein if the matching function is 0 (if there is no matched Gaussian distribution), the emotion learning unit generates a Gaussian distribution that satisfies weight $\omega_{j,M_j(k+1)}(k+1)$, a central value $\mu_{j,M_j(k+1)}(k+1)$, and a variance $\sigma_{j,M_j(k+1)}^2(k+1)$ based on the feedback information as follows:

$\omega_{j,M_j(k+1)}(k+1)=\lambda$ $\mu_{j,M_j(k+1)}(k+1)=x(k+1)$; and $\sigma_{j,M_j(k+1)}^2(k+1)=\sigma^2$, wherein $\omega_{j,M_j(k+1)}(k+1)$ is the weight of a Gaussian distribution having the $j^{th}$ emotion distribution in the time k+1, $\lambda$ is the predetermined basic weight, $\mu_{j,M_j(k+1)}(k+1)$ is the central value of the Gaussian distribution having the $j^{th}$ emotion distribution in the time k+1, $x(k+1)$ is the feedback information, $\sigma_{j,M_j(k+1)}^2(k+1)$ is the variance of the Gaussian distribution having the $j^{th}$ emotion distribution in the time k+1, $\sigma^2$ is a predetermined basic variance, and $M_j(k+1)$ is a number of Gaussian distributions included in the $j^{th}$ emotion distribution in the time k+1.

8. The apparatus of claim 6, wherein the emotion learning unit normalizes weights of all Gaussian distributions corresponding to each emotion after the Gaussian distribution is changed.

9. A method for a robot capable of learning emotion, the method comprising the steps of:

detecting, by an internal state calculation unit, external environment information, calculating an internal state vector value corresponding to one point of an internal state coordinate system based on the detected external environment information, and generating an internal state based on the calculated internal state vector value;

deciding, by an emotion decision processing unit equipped with an emotion model in which an emotion probability distribution for j types of emotions is formed on an n-dimensional internal state coordinate system, an emotion value of the robot by matching an input value of the internal state calculation unit with the internal state coordinate system;

deciding, by a behavior generation unit, a behavior of the robot based on the emotion value decided by the emotion decision processing unit and making an emotional expression based on the decided behavior; and generating, by an emotion learning unit, feedback information on the emotion value corresponding to one point of the internal state coordinate system based on the emotion value decided by the emotion decision processing unit and information on a type of emotion received from a user input unit and changing an emotion probability distribution of the internal state coordinate system based on the feedback information, wherein the emotion probability distribution comprises a first Gaussian distribution having weight, a central value, and a variance, or a second Gaussian distribution comprising a plurality of the first Gaussian distribution, and wherein the emotion learning unit is configured to retrieve a Gaussian distribution corresponding to the feedback information using a matching function and is configured to change the Gaussian distribution of the emotion probability distribution based on the retrieved Gaussian distribution.

* * * * *